(12) United States Patent
Rois et al.

(10) Patent No.: US 11,855,433 B2
(45) Date of Patent: Dec. 26, 2023

(54) SUPPORT ASSEMBLY FOR POWER CONDUCTORS

(71) Applicant: ERICO International Corporation, Solon, OH (US)

(72) Inventors: Steven Rois, Highland Heights, OH (US); Pascal Godard, St. Georges Haute Ville (FR); Frederic Bizet, Chatillon d'Azergues (FR)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 17/679,506

(22) Filed: Feb. 24, 2022

(65) Prior Publication Data

US 2022/0271522 A1 Aug. 25, 2022

Related U.S. Application Data

(60) Provisional application No. 63/153,195, filed on Feb. 24, 2021.

(51) Int. Cl.
*H02G 3/32* (2006.01)
*F16B 2/20* (2006.01)

(52) U.S. Cl.
CPC ............ *H02G 3/32* (2013.01); *F16B 2/20* (2013.01)

(58) Field of Classification Search
None
See application file for complete search history.

(56) References Cited

U.S. PATENT DOCUMENTS

| | | |
|---|---|---|
| 3,245,031 A | 4/1966 | Barney et al. |
| 3,758,922 A | 9/1973 | Field |
| 4,707,891 A | 11/1987 | Chidester |
| 5,147,145 A | 9/1992 | Facey et al. |
| 5,944,566 A | 8/1999 | Gossmann |
| 6,390,861 B1 | 5/2002 | DeFrance |
| 6,649,840 B2 | 11/2003 | Triantopoulos et al. |
| 6,989,491 B2 | 1/2006 | Triantopoulos et al. |

(Continued)

FOREIGN PATENT DOCUMENTS

| | | |
|---|---|---|
| CN | 207021635 U | 2/2018 |
| CN | 207459655 U | 6/2018 |

(Continued)

*Primary Examiner* — Steven M Marsh
(74) *Attorney, Agent, or Firm* — QUARLES & BRADY LLP

(57) ABSTRACT

A support assembly, for supporting one or more conductors of a low voltage power distribution system, can include an adjustable clip subassembly. The adjustable clip subassembly can include a housing, a clip, and a biasing element. The housing can define a receiving space, and the clip can define a receiving region. The clip can be positioned within the receiving space so that the receiving region receives the housing. The biasing element can be disposed between the clip and the housing and configured to bias the clip away from the housing. The subassembly can be configured to move between an open configuration and a closed configuration. In the open configuration, the clip can compress the biasing element against the housing, allowing for insertion of a conductor into the receiving space. In the closed configuration, clip can be laterally translated, relative to the open configuration, to engage the conductor.

20 Claims, 17 Drawing Sheets

(56) References Cited

U.S. PATENT DOCUMENTS

| | | | |
|---|---|---|---|
| 7,049,507 B2 | 5/2006 | Sutehall et al. | |
| 7,172,161 B2* | 2/2007 | Rosemann | H02G 3/32 |
| | | | 248/548 |
| 7,173,187 B2 | 2/2007 | Triantopoulos et al. | |
| 8,523,602 B2 | 9/2013 | Figie | |
| 8,585,422 B2 | 11/2013 | Balcerak et al. | |
| 8,684,764 B2 | 4/2014 | Figie | |
| 8,961,218 B2 | 2/2015 | Figie | |
| 9,000,299 B2 | 4/2015 | Ruth | |
| 9,190,759 B2 | 11/2015 | Balcerak et al. | |
| 9,431,810 B2 | 8/2016 | Luthi et al. | |
| 10,458,516 B2 | 10/2019 | Jenkin | |
| 10,649,169 B2 | 5/2020 | Al Ghossein et al. | |
| 10,962,089 B2 | 3/2021 | Jenkin | |
| 10,988,341 B1 | 4/2021 | Curran | |
| 2008/0185183 A1 | 8/2008 | Chen | |
| 2010/0267277 A1* | 10/2010 | Robinson | G01R 11/04 |
| | | | 439/517 |
| 2011/0076900 A1* | 3/2011 | Keswani | H01R 4/4818 |
| | | | 439/787 |
| 2012/0058668 A1* | 3/2012 | De Bruijn | H01R 12/68 |
| | | | 439/399 |
| 2013/0146721 A1* | 6/2013 | White | H02G 3/32 |
| | | | 248/68.1 |
| 2015/0014489 A1* | 1/2015 | Kuhm | H02G 3/32 |
| | | | 248/70 |
| 2018/0306351 A1 | 10/2018 | Leo, Sr. et al. | |

FOREIGN PATENT DOCUMENTS

| | | | | |
|---|---|---|---|---|
| CN | 207504187 U | 6/2018 | | |
| CN | 108808272 A | 11/2018 | | |
| CN | 208423193 U | 1/2019 | | |
| CN | 208508454 U | 2/2019 | | |
| CN | 207994561 U | 10/2019 | | |
| CN | 210577637 U | 5/2020 | | |
| CN | 111614031 A | 9/2020 | | |
| CN | 109630756 B | * 12/2020 | ............... | F16L 3/08 |
| CN | 110635428 B | 1/2021 | | |
| DE | 4013998 A1 | 11/1991 | | |
| EP | 1615307 A1 | 1/2006 | | |
| EP | 2599176 B1 | 4/2016 | | |
| EP | 2783439 B1 | 10/2017 | | |
| ES | 2008002 A6 | 7/1989 | | |
| WO | 2011/039008 A1 | 4/2011 | | |
| WO | 2014/198425 A1 | 12/2014 | | |

* cited by examiner

SUPPORT ASSEMBLY FOR POWER CONDUCTORS

CROSS-REFERENCE TO RELATED APPLICATIONS

This application claims priority to provisional patent application Ser. No. 63/153,195, titled Support Assembly for Power Conductors and filed Feb. 24, 2021, the entirety of which is incorporated herein by reference.

BACKGROUND

Support of electrical conductors can be important in a variety of contexts. In some electrical grids, high-to-low voltage transformers or other electrical modules can supply power to power distribution modules, which may distribute the power to individual power taps or access points. For example, a transformer can be linked to a power distribution module that supplies power to the lights, outlets, and any other electronic devices in a residential home or a commercial space. Similarly, other transmission of low voltage power between modules may also be useful in a variety of contexts. Conductors are commonly used to link a transformer to a power distribution module. In some installations, a plurality of conductors are routed between a transformer and a power distribution module.

SUMMARY

Some embodiments of the invention provide a support assembly for supporting one or more conductors. The support assembly can include a first clip subassembly. The first clip subassembly can include a first housing with a first lateral wall and a second lateral wall extending from opposing sides of a base to define a first receiving space between the first and second lateral walls for one or more conductors. The first clip subassembly can further include a first clip, a second clip, a first biasing element, and a second biasing element. Each of the first and second clips can include sidewalls extending from a base wall. The first and second clips can be disposed so that the first lateral wall of the first housing is received between the sidewalls of the first clip, and the second lateral wall of the first housing is received between the sidewalls of the second clip. The first biasing element can be disposed between the first clip and the first lateral wall to bias the first clip toward the second clip. The second biasing element can be disposed between the second clip and the second lateral wall to bias the second clip toward the first clip. The first and second clips can be movable relative to the first and second lateral walls to selectively place the first clip subassembly in an open configuration and a closed configuration. In the open configuration, the first and second clips can provide a first clearance within the first receiving space for insertion of the conductor. In the closed configuration, the first and second clips can be laterally displaced toward each other, relative to the open configuration, to provide a second clearance within the first receiving space to retain the conductor, the second clearance being smaller than the first clearance. The first and second clips can be lockable relative to the first housing to secure the first clip assembly in the open configuration.

Some embodiments of the invention provide an adjustable clip assembly for use in a support assembly for supporting conductors. The adjustable clip assembly can include a housing, a clip, and a biasing element. The housing can include opposing lateral walls extending from a base portion to define a receiving space. The biasing element can be disposed between the clip and the housing to bias the clip into the receiving space. The adjustable clip assembly can be configured to move between an open configuration and a closed configuration, the clip being locked to the housing to compress the biasing element between the clip and the housing in the open configuration, and the clip being displaced into the receiving space by the biasing element in the closed configuration, relative to the open configuration, to engage and retain the conductor.

Some embodiments of the invention provide a support assembly for supporting conductors. The support assembly can include a first clip subassembly and a second clip subassembly. Each of the first clip subassembly and the second clip subassembly can include a housing, a clip, and a biasing element. The housing can include opposing lateral walls extending from a base portion to define a receiving space. The clip can include opposing sidewalls extending from a base wall, the clip being movably secured to the housing with the housing received between the opposing sidewalls. The biasing element can be disposed between the base wall of the clip and the housing to bias the clip away from the housing. Further, each of the subassemblies can be configured to move between an open configuration and a closed configuration and to engage the housing to be locked in the open configuration, the base wall of the clip being positioned farther from the housing in the closed configuration than in the open configuration.

Some embodiments of the invention provide a method of securing a flexible conductor with a support assembly. A first clip of a first clip subassembly of the support assembly can be moved against the bias of a first biasing element, from a closed configuration to an open configuration, so that the first clip is temporarily locked in the open configuration by a first housing of the first clip subassembly, wherein the first clip extends into a first receiving area of the first housing by a smaller distance in the open configuration than in the closed configuration. A flexible conductor can be inserted into the first receiving area along an elongate direction of the flexible conductor. After inserting the flexible conductor into the first receiving area, the first clip can be released from being temporarily locked by the first housing so that the first biasing element moves the first clip toward the closed configuration to engage the flexible conductor within the first receiving area and thereby secure the flexible conductor against removal from the support assembly.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
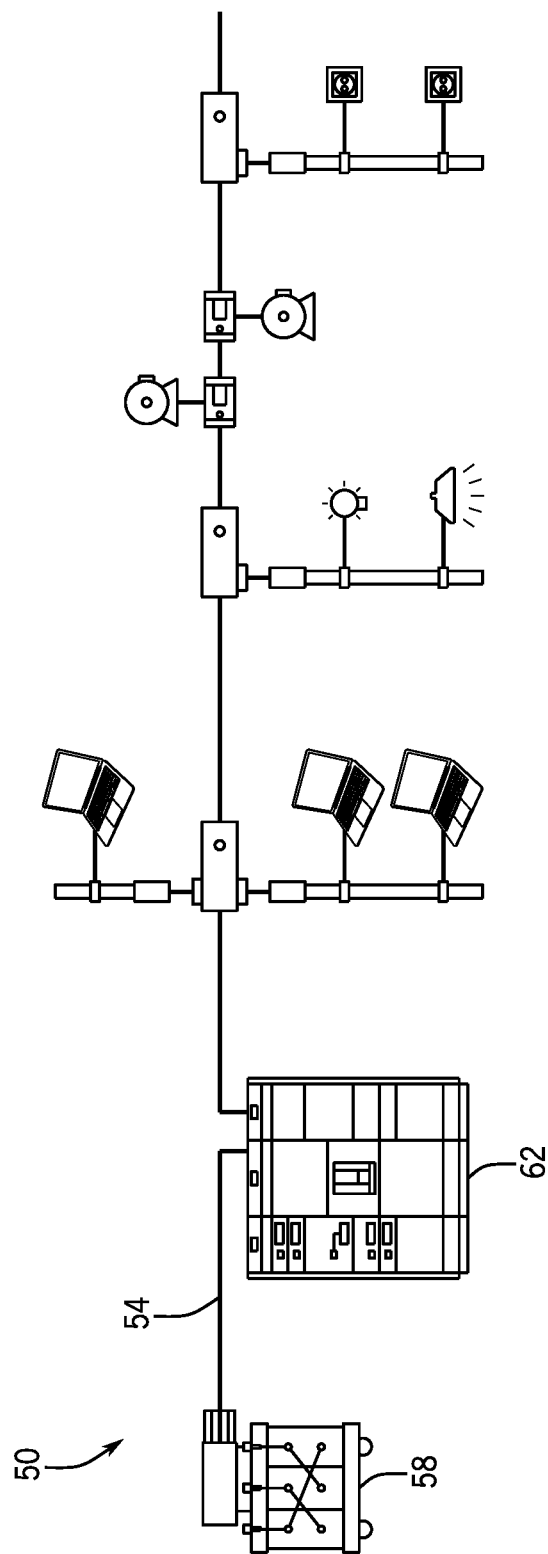
FIG. 1 is a schematic view of a power distribution system according to an embodiment of the invention, the power distribution system including a transformer, a power distribution module, and a low voltage power conductor.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon, e.g., "at least one of") and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise specified or limited, "substantially identical" is used to indicate components or assemblies that are formed using the same processes and according to the same design and the same specifications (e.g., with regard to dimensions, tolerances, materials, and manufacturing techniques), such that variation between the components or assemblies falls within conventionally acceptable variation between instances of the particular type of manufactured parts. In some cases, substantially identical features can be geometrically congruent.

Also as used herein, unless otherwise limited or defined, "integral" and derivatives thereof (e.g., "integrally") describe elements that are manufactured as a single piece without fasteners, adhesive, or the like to secure separate components together. For example, an element stamped as a single-piece component from a single piece of sheet metal, without rivets, screws, or adhesive to hold separately formed pieces together is an integral (and integrally formed) element. In contrast, an element formed from multiple pieces that are separately formed initially then later connected together, is not an integral (or integrally formed) element.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to support electrical conductors in a variety of contexts, including to electrically link a high-to-low voltage transformer to a power distribution module or otherwise provide for transmission of low voltage electrical power between different electrical modules. Commonly, for example, a plurality of conductors are used to electrically link a transformer and a power distribution module. In some installations, it may be useful to route, constrain, and otherwise align the conductors between a transformer and a power distribution module (or between other electrical systems). For example, conductors may need to be substantially isolated or organized to mitigate electromagnetic interference. In some installations, a conductor may be a low voltage power conductor that comprises one or more power braids with insulating sheaths. The conductor can be flat with an oblong cross-section that is substantially wider than it is tall. This may be helpful, for example, in order to provide a highly flexible low voltage power conductor without compromising its strength. Also, this construction and cross-section can enable the conductor to be twisted, folded, bent, or otherwise substantially manipulated into any variety of shapes. Thus, for example, a need exists for an adaptable support system that can simplify installation of conductors or accommodate conductors of various sizes that may be arranged in various orientation.

Embodiments of the invention can be useful for this purpose, and others. For example, embodiments of the invention may include a support system for aligning electrical conductors that are used to supply power from a transformer to a power distribution module. Furthermore, embodiments of the invention can be useful for supporting and aligning conductors of a variety of shapes (e.g., cross-sectional or perimeter shapes), sizes (e.g., cross-sectional sizes) and orientations, as may vary depending on a capacity of a conductor or other factors.

In some embodiments, a support system may use a series of biased members (e.g., clips operating as plungers) for securing one or more conductors of a variety of thicknesses. In some embodiments, a support system may include one or more spring actuated clips that are configured to clamp a conductor. For example, spring-based clips can be configured to move between an open configuration and a closed configuration via manual (e.g., tool-less) engagement of the clips. In some instances, the clips are held in the open configuration by engagement of the clip with a retention feature (e.g., projection or recess) on a surrounding housing. Correspondingly, manual release of the clip from the retention feature can facilitate spring actuation, biasing the clip from the open configuration to the closed configuration. In the closed configuration, the clip may engage (e.g., directly contact), and thereby help to retain, a conductor that is disposed within a receiving space. In this regard, the clips can operate as plungers that displace a variable distance into the receiving space to selectively retain conductors of different widths. Similar to plungers in various other applications, movement of the clip can sometimes be constrained in all but one dimension (i.e., into the receiving space). Some embodiments of the invention can be modular and free of fasteners, and may require no tools during installation, which may (individually or collectively) allow for quick, easy, and versatile installation.

Figure 2:
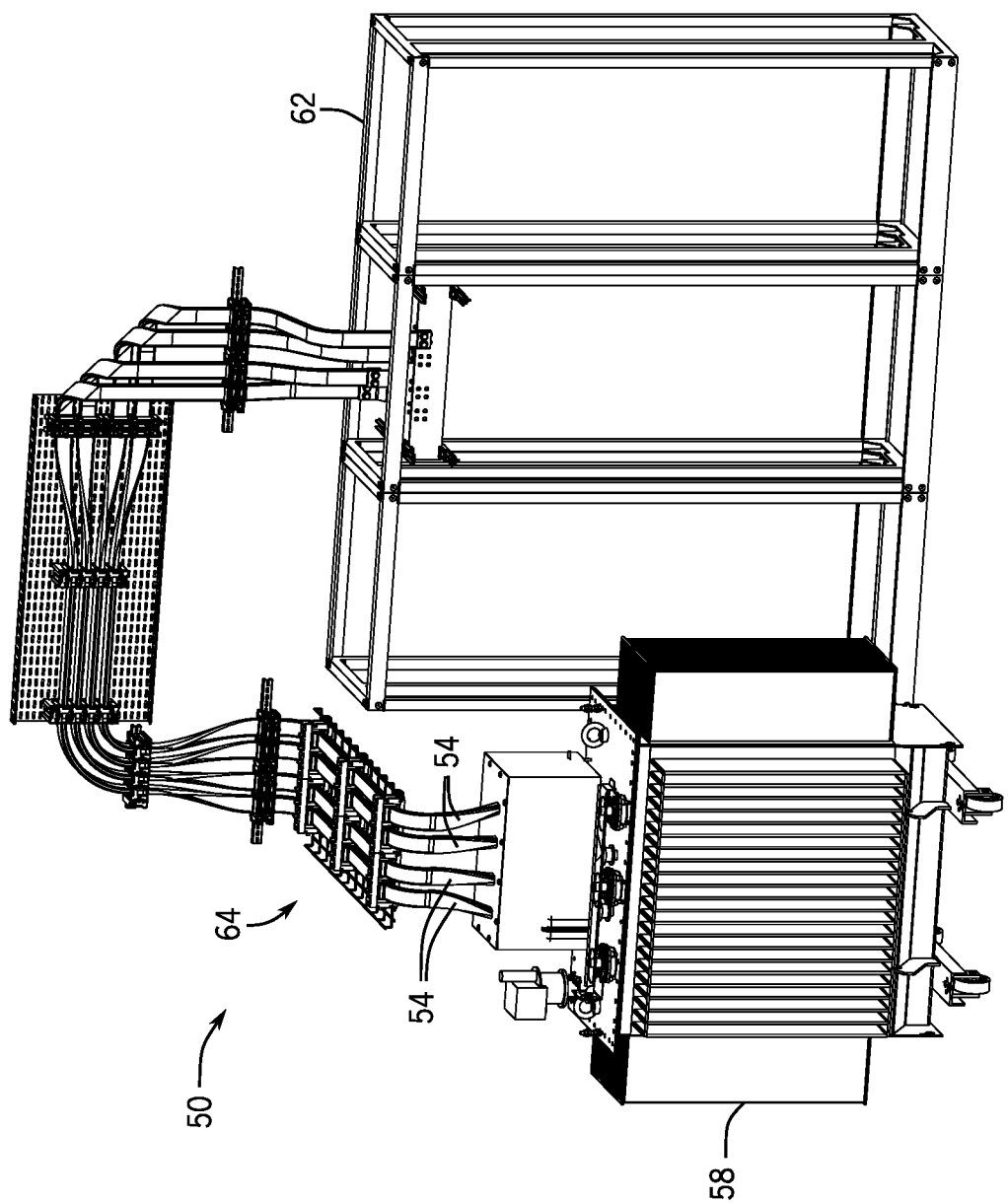
FIG. 2 is a detailed isometric view of part of the power distribution system of FIG. 1 according to an embodiment of the invention.

FIGS. 1 and 2 illustrate example configurations of a power distribution system 50 configured to distribute power from an electrical grid, according to some embodiments of the invention. Although embodiments of the invention can be used in other settings, the illustrated configuration may be particularly advantageous in some cases. As shown in FIG. 2 in particular, in the illustrated embodiment, the power distribution system 50 includes a set of low voltage power conductors 54 that are attached to a transformer 58 and a power distribution module 62 (e.g., a switch cabinet) at single respective attachment points for each of the conductors 54 at the transformer 58 and the power distribution module 62, respectively. The low voltage power conductors 54 are configured to electrically link the power distribution module 62 to the transformer 58, which is connected to the power grid, thereby supplying power to the power distribution module 62. From the power distribution module 62, power can then be distributed to other electronics over various types of conductors, including by using similar conductors to the conductors 54 or others.

In the embodiment illustrated, the low voltage power conductor 54 is configured to provide a single conductive connector per phase, although other configurations are possible. For example, a similar arrangement can include multiple connectors per phase between a transformer and a power distribution module (or between other electrical equipment), such as may facilitate transmission of more current for particular applications. In some such arrangements, each connector may be configured to utilize its own respective attachment point, such as may be provided by an attachment lug or other device.

Further, in some arrangements, each conductor may be individually routed between the transformer 58 and the power distribution module 62. For example, FIG. 2 illustrates an example configuration of a support assembly 64 that is configured to support, align, or otherwise restrain the conductors 54 between the transformer 58 and the power distribution module 62. The illustrated embodiment is just one example of an arrangement in which the present invention may be particularly useful. Other configurations are possible, including as will be discussed below.

Figure 3:
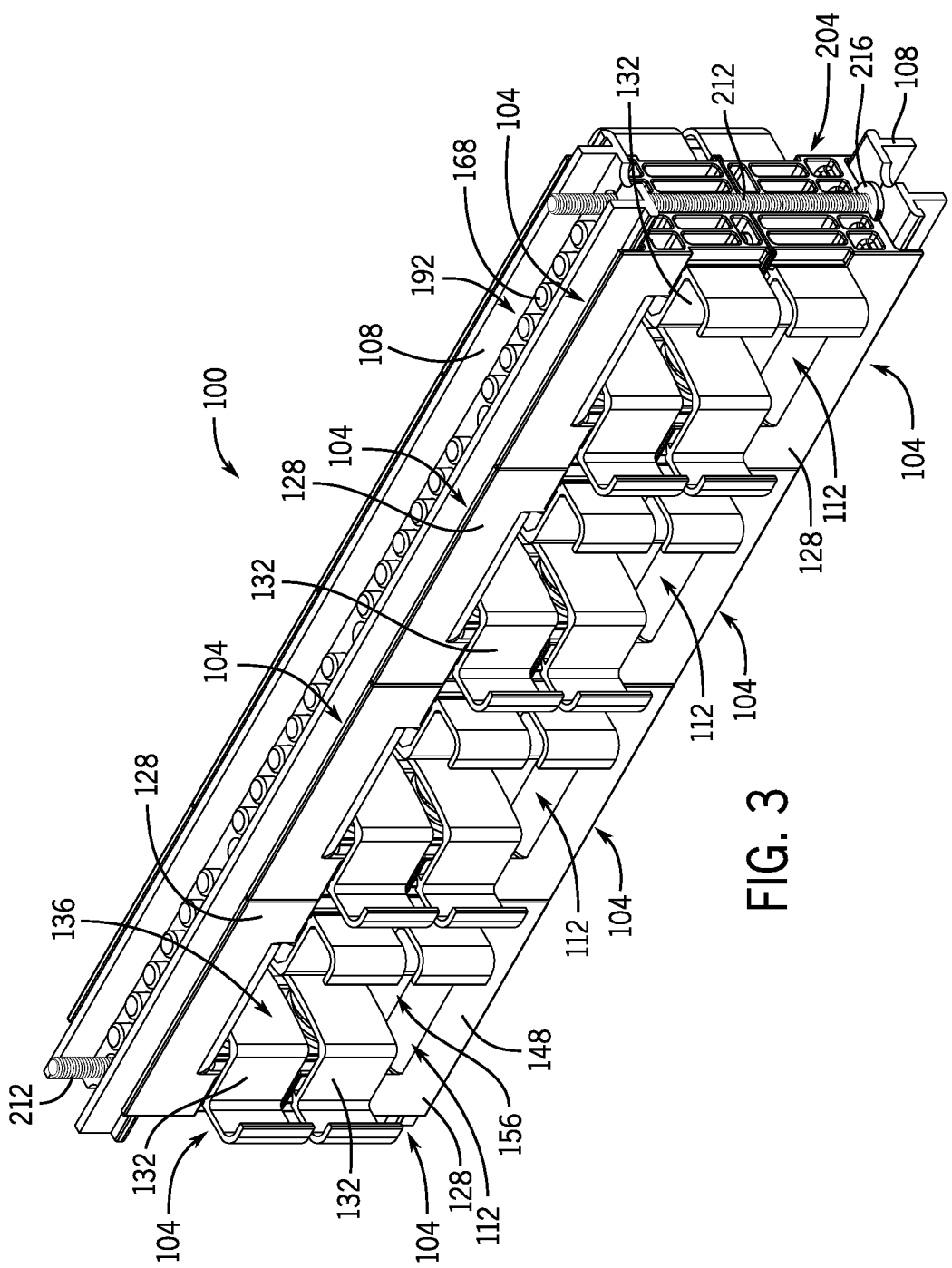
FIG. 3 is an isometric view of a support assembly for supporting conductors according to an embodiment of the invention.
Figure 4:
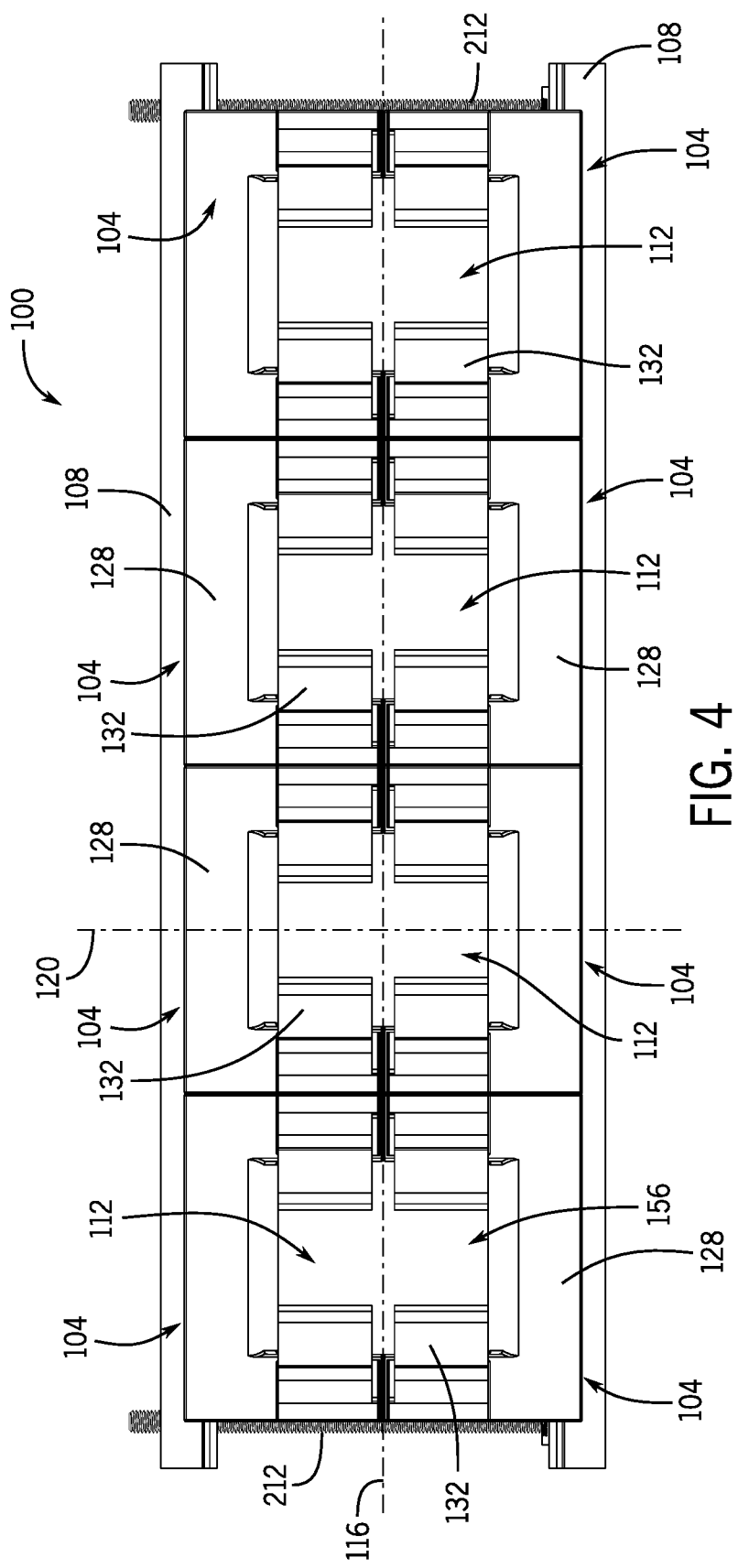
FIG. 4 is a front elevation view of the support assembly of FIG. 3.

FIGS. 3 and 4 illustrate an example configuration of a support assembly 100 in detail. The support assembly 100 may be useful in power distribution systems, including as part of the support assembly 64 of the power distribution system 50 shown in FIG. 2. In the illustrated embodiment, the support assembly 100 is generally a modular assembly that includes a plurality of adjustable clip subassemblies 104 that are connected to mounting struts 108 and define a plurality of receiving passages 112 for receiving and retaining conductors. Particularly, as illustrated, two of the clip subassemblies 104 together define one of the receiving passages 112.

The receiving passages 112, and the components defining the passages, may be substantially symmetrical, e.g., about axis 116 and axis 120 of FIG. 4, as may allow for particularly adaptable installation, although other configurations are possible. In the illustrated embodiment, the receiving passages 112 are arranged to receive conductors in a generally vertical orientation. However, support assemblies according to other embodiments may be configured to receive conductors at different orientations (e.g., horizontally or diagonally).

While the present embodiment includes eight adjustable clip subassemblies 104 that define four receiving passages 112, any number of adjustable clip subassemblies and receiving passages may be feasible in alternative embodiments (e.g., any number of one or more receiving passages).

The clip subassemblies 104 are configured to be arranged along mounting struts 108, which may be secured to an underlying structure (e.g., a ceiling structure, an enclosure, or a frame). As further discussed below, aspects of the mounting struts 108 as illustrated may provide particular benefits in some cases. However, some embodiments can be configured for installation with other support structures, including struts of standard configuration or other known support rails.

Figure 5:
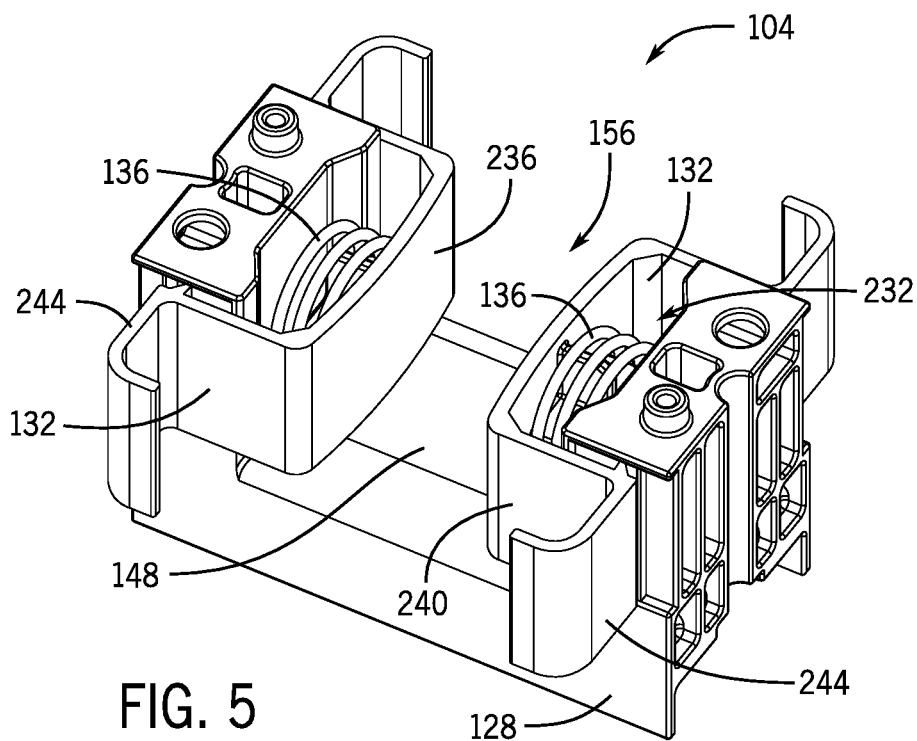
FIG. 5 is an isometric view of an adjustable clip subassembly for use in the support assembly of FIG. 3.

FIG. 5 illustrates an example configuration of the adjustable clip subassembly 104 in detail. The configuration of these components for, and their inclusion in, the support assembly 100 is presented as an example only. Other arrangements are possible.

Figure 6:
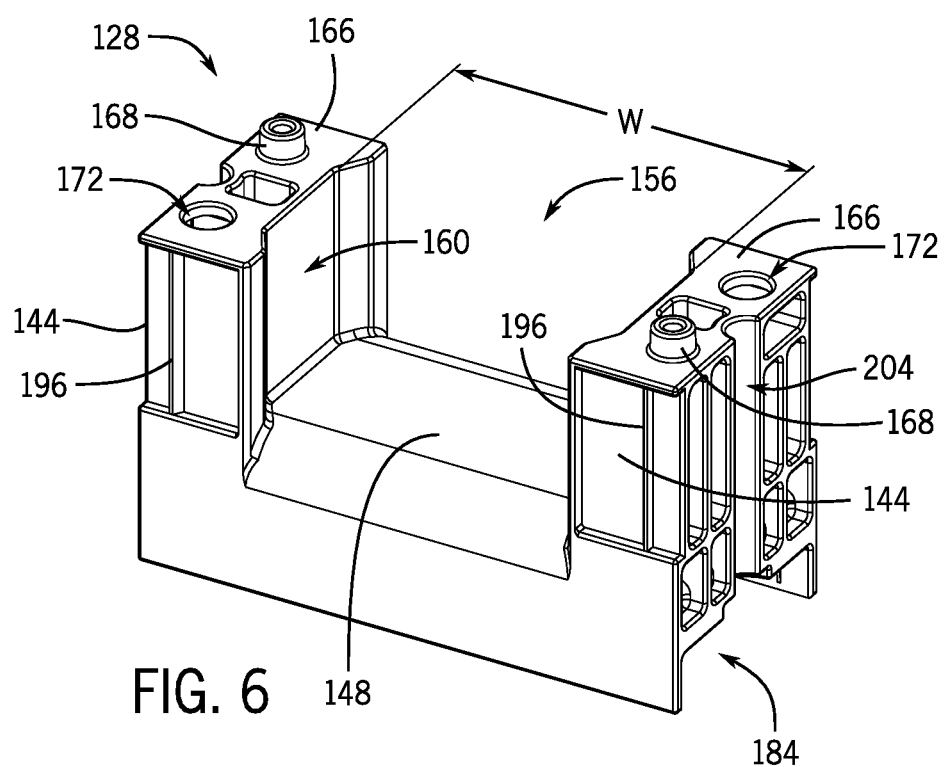
FIG. 6 is an isometric view of a housing for use in the adjustable clip subassembly of FIG. 5.

In particular, the adjustable clip subassembly 104 includes a housing 128 and a set of two biased clips 132 each with a corresponding biasing element 136. In the illustrated embodiment, the biasing element 136 is a helical spring, but other components may be used to bias clips in alternative embodiments. For example, in other embodiments, the biasing element could be a leaf spring, a wave spring, a volute spring, a cantilever spring, or any other known mechanism suitable for biasing a clip relative to a housing. Referring to FIG. 6, the housing 128 is generally a U-shaped structure, including opposing lateral walls 144 extending from opposing ends of a base 148 to define a receiving space 156 having a width W. In particular, as illustrated, distal ends 166 of the opposing lateral walls 144 of the housing 128 define an open end of the receiving space 156. Inner surfaces of the lateral walls 144 define a recessed region 160, which may define a concave shape. The recessed regions 160 may be configured to receive and/or engage an end of a biasing element (see, e.g., the biasing element 136 of FIG. 5). In some embodiments, additional elements may be included for retaining the end of a biasing element, such as, hooks, pins, fasteners, adhesives, clips, etc. Additionally, while the illustrated embodiment has two biased clips, other configurations are possible, including, for example, embodiments wherein an adjustable clip subassembly includes only a single biased clip.

Still referring to FIG. 6, in some cases, the housing 128 can be configured to be removably coupled to a substantially identical housing, such that the receiving spaces of both housings are continuous with each other and define a receiving passage. In this regard, for example, when distal ends 166 of the lateral walls 144 of the housing 128 are aligned with corresponding distal ends of the lateral walls of a substantially identical housing, the individual receiving spaces 156 of the respective housings 128 may be continuous (e.g., collectively provide a single, fully bounded receiving space), defining a receiving passage (see, e.g., the receiving passages 112 of FIG. 3) configured for receiving and retaining a conductor. In some embodiments, the receiving passage can be bounded on opposing ends by the bases 148 of the two substantially identical housings (e.g., similar to the housing 128). In some embodiments, a height dimension of the receiving passage can be parallel to the direction in which the lateral walls extend from the base of the respective housings and can be twice the length of a height dimension of a receiving space of a single housing. Using substantially identical housings as described above can be particularly beneficial, as it may reduce the number of different parts required to install a support assembly, and it can reduce manufacturing costs and efforts as only a single specification is needed to manufacture the subassemblies and the housings.

Figure 8:
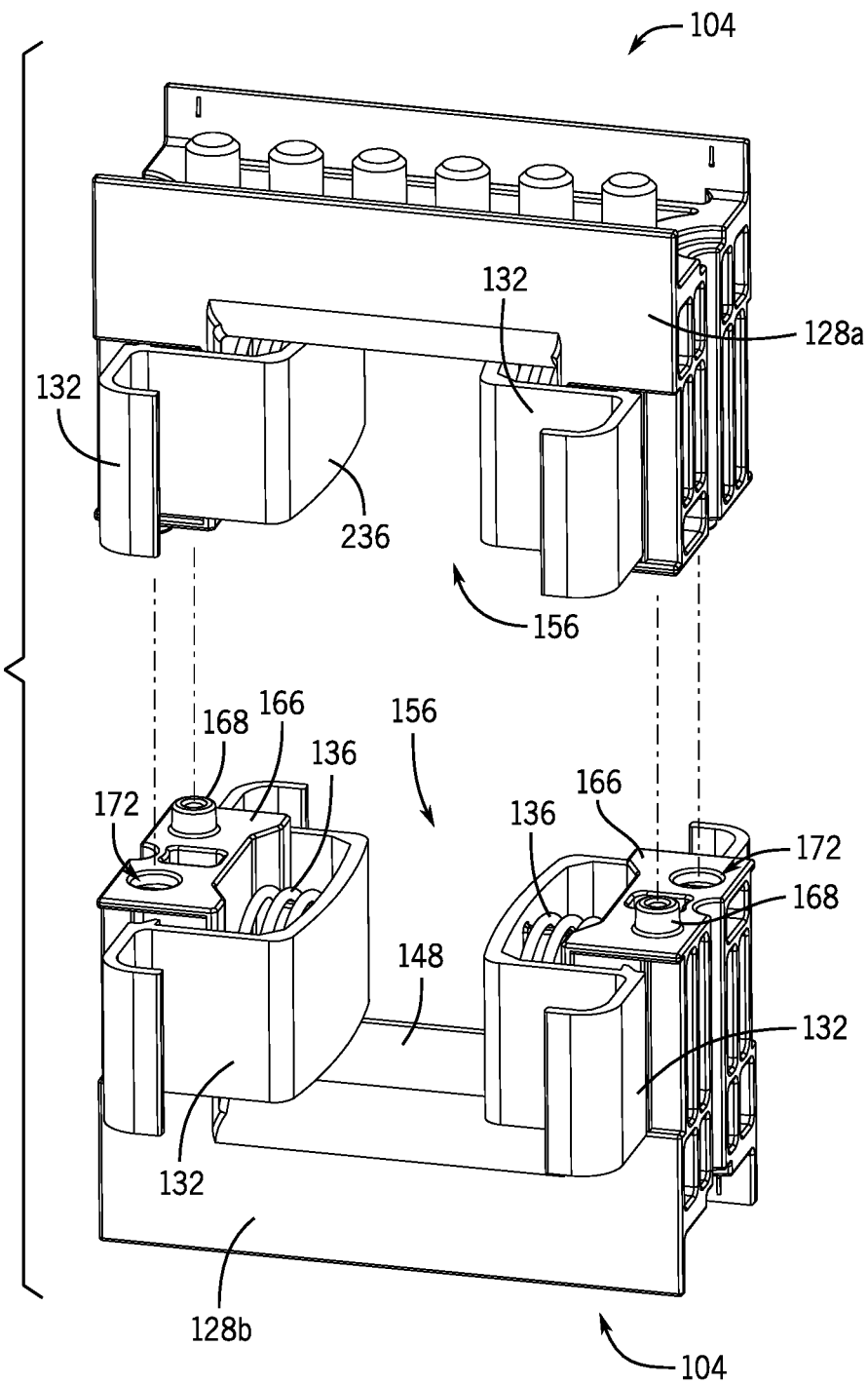
FIG. 8 is an exploded isometric view of corresponding adjustable clip subassemblies for use in the support assembly of FIG. 3.

In this regard, it can be advantageous for housings to include mechanisms for securing one housing to another when two housings are coupled together to define a receiving passage. In the illustrated embodiment, for example, the housing 128 includes locking protuberances 168 and locking apertures 172 that are configured to respectively mate with locking apertures and locking protuberances of another housing body. As shown in FIG. 6, the locking protuberances 168 and the locking apertures 172 are arranged on the distal ends 166 of the lateral walls 144, with each of the distal ends 166 including one locking protuberance 168 and one locking aperture 172. The illustrated locking protuberances 168 and the locking apertures 172 are positioned to respectively align with a mating aperture or protuberance of a corresponding other housing. For example, turning to FIG. 8, the locking protuberances 168 (not shown in FIG. 8) of a first housing 128a are configured to align with the locking apertures 172 of a second housing 128b. Likewise, the locking apertures 172 (not shown in FIG. 8) of the first housing 128a are configured to align with the locking protuberances 168 of the second housing 128b. The locking protuberances 168 are configured to be press-fit into the locking apertures 172 to couple the housings 128a, 128b together. However, in alternative embodiments, different methods of coupling housings are possible (e.g., clips, clasps, latches, interlocking shoulders or lips, dove-tail joints, etc.).

In some cases, it can be beneficial for a housing to include features to enable installation of the housing onto a support structure (e.g., a strut). Housings for receiving conduits can further include geometries that increase their stability by preventing movement relative to the support structure. In this regard, for example, FIG. 7. shows a mounting channel 184 on a bottom side of the base 148 (i.e., opposing the receiving space 156), the mounting channel 184 being operable for securing the housing 128 to an underlying support (e.g., the mounting strut 108 shown in FIG. 3). In the illustrated example, the mounting channel 184 is sized to receive a mounting strut (not shown in FIG. 7) in a nested configuration. As illustrated, the channel 184 further includes a plurality of mounting protuberances 188 that are configured to be received and retained by mounting openings defined along a mounting strut (see, e.g., mounting openings 192 of the mounting strut 108 in FIG. 3). When the housing 128 is installed on a strut (e.g., the mounting strut 108 in FIG. 3), the engagement of the mounting protuberances 188 and the mounting openings (e.g., mounting openings 192 in FIG. 3) prevents translational movement of the housing in a direction parallel to an elongate direction of the strut. The mounting protuberances 188 in the illustrated embodiment extend orthogonally from an underside of the housing 128 into the mounting channel 184, and are evenly spaced from each other along the mounting channel 184, but other configurations are possible. Additionally or alternatively, housings according to alternative embodiments may be secured to underlying structures in a variety of ways (e.g., using adhesives, fasteners, latches, slots, magnets, etc.).

Figure 7:
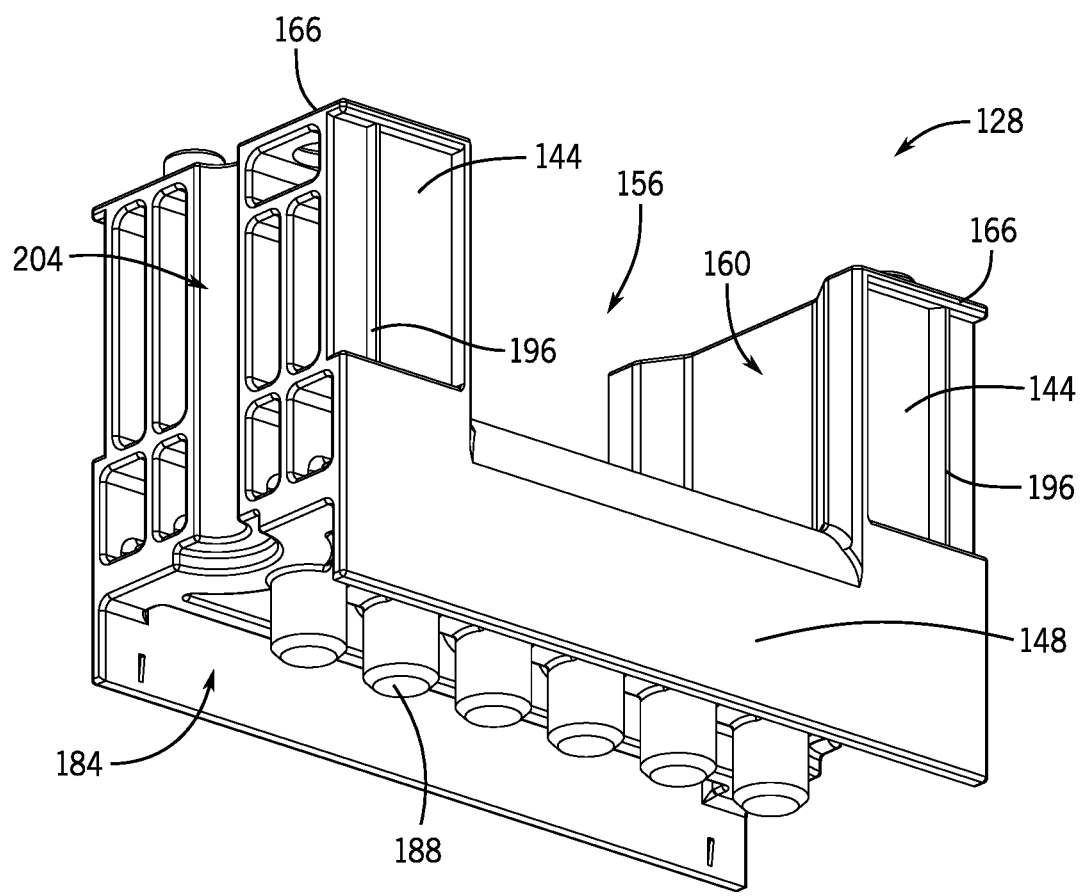
FIG. 7 is another isometric view of the housing of FIG. 6.

As also shown in FIG. 7, mating projections 196 may be disposed along the lateral walls 144. As further described below, the mating projections 196 can help to selectively and temporarily hold the clip 132 in an open configuration.

Still referring to FIG. 7, the housing 128 further includes channels 204 defined along lateral sides of the lateral walls 144 (e.g., semi-cylindrical channels, as shown, or other partly cylindrical channels). Each of the channels 204 extends from the mounting channel 184 to the distal end 166 of the corresponding lateral wall 144. Generally, the channels 204 are configured to receive a fastener for securing the housing 128 to an underlying structure. For example, referring to FIG. 3, the clip subassemblies 104 can be disposed between the two opposing mounting struts 108 and secured on ends thereof using threaded rods 212. The threaded rods 212 seat within the channels 204 of the outer clip subassemblies 104, thereby restraining the subassemblies 104 laterally and longitudinally. Further, in the illustrated embodiment, the threaded rods 212 are inserted through one of the mounting struts 108, the semi-cylindrical channels 204 of adjacent housings 128, and subsequently threadably received by a threaded nut 216 provided on the other mounting strut 108 (e.g., integral to the mounting strut 108 or separately formed).

Accordingly, in some installations, a support assembly according to embodiments of the present invention requires only rods (e.g., similar to rod 212) at ends of the assembly to secure the assembly to a structure, which can be significantly less complex than existing solutions. In some installations, end rods may be sufficient for securing an assembly regardless of its size. That is, an assembly that defines three receiving passages and an assembly that defines six receiving passages may similarly be installed using two threaded rods. Therefore, during installation, an installer may only need two threaded rods regardless of the assembly design.

In other embodiments, however, additional threaded rods may be used between each of the housings or between a select subset thereof. For example, semi-cylindrical channels of adjacent housings may align to define a complete cylindrical channel, which may receive a threaded rod. Incorporating additional threaded rods between intermediate subassemblies of a support assembly may enhance the assembly's structural integrity and enable quick modifications, in some cases. For example, an installer can easily add and/or remove one or more subassemblies without risking misalignment or failure of the existing system. While the discussion above and the embodiments illustrated herein use threaded rods, other configurations are possible. For example, partially-threaded rods, bolts, pins, latches, or the like may be used in addition to or instead of the threaded rods.

Figure 9:
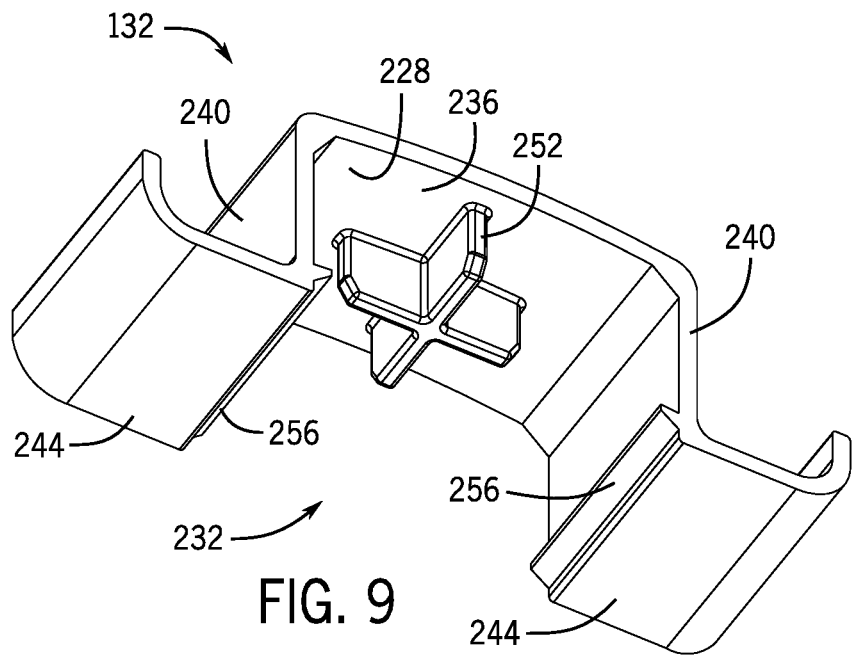
FIG. 9 is an isometric view of a clip for use in the adjustable clip subassembly of FIG. 5.
Figure 10:
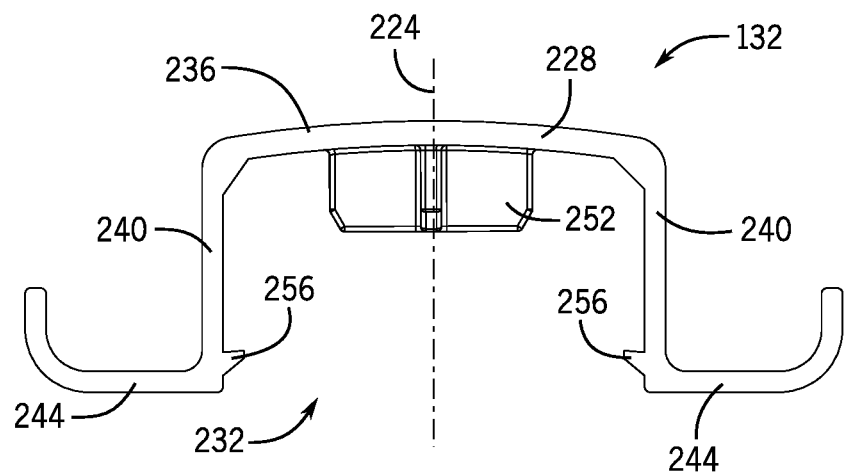
FIG. 10 is a side elevation view of the clip of FIG. 9.

Referring again to FIG. 5, the adjustable clip subassembly 104 includes two of the opposing biased clips 132. The opposing clips 132 in the illustrated embodiment are substantially identical, so the description provided below is applicable to each of the clips 132 illustrated in the present embodiment. However, opposing clips in alternative embodiments may be different. Referring to FIGS. 9 and 10, each of the biased clips 132 is generally U-shaped and symmetrical about a central axis 224 (see FIG. 10), and includes a central portion 228 that defines a receiving region 232. In the embodiment illustrated, the central portion 228 is substantially U-shaped, including a base wall 236 and opposing sidewalls 240 but other configurations are possible. Opposing engagement tabs 244 extend from the sidewalls 240 outwardly (i.e., away from the receiving region 232) and distal ends of the engagement tabs 244 are flared in the illustrated embodiment. However, other configurations are possible in alternative embodiments.

In some cases, retaining elements (e.g., protrusions or recesses of various shapes) can be included on the body of a clip to provide stability and help secure a biasing element to the clip. In this regard, FIG. 9 illustrates a retaining element 252 on an inner surface of the base wall 236 of clip 132. As shown, the retaining element 252 extends outward from the inner surface of the base wall 236 into the receiving region 232. The retaining element 252 is configured to retain a biasing element (e.g., similar to the biasing element 136 in FIG. 5). In the illustrated embodiment, the retaining element 252 is a cross-shaped projection that extends from the inner surface of the base wall 236. But, a retaining element may be different in other embodiments (e.g., it may include one or more differently shaped projections or one or more recesses). Additionally or alternatively, elements separate from a clip body may be used to secure a biasing element to a clip body in some embodiments (e.g., adhesives, snap-on clips or other fasteners, etc.).

The clip 132 also includes opposing latch projections 256 that extend from an inner surface of the sidewalls 240 inwardly (e.g., toward the receiving region 232). The latch projections 256 are generally configured to engage portions of the housing 128 (see, e.g., FIG. 8), which will be explained in greater detail below. In other embodiments, the latch projections 256 can be supplemented or replaced with other latch features, including protrusions of other configurations, recesses, other detent structures, etc.

Figure 11:
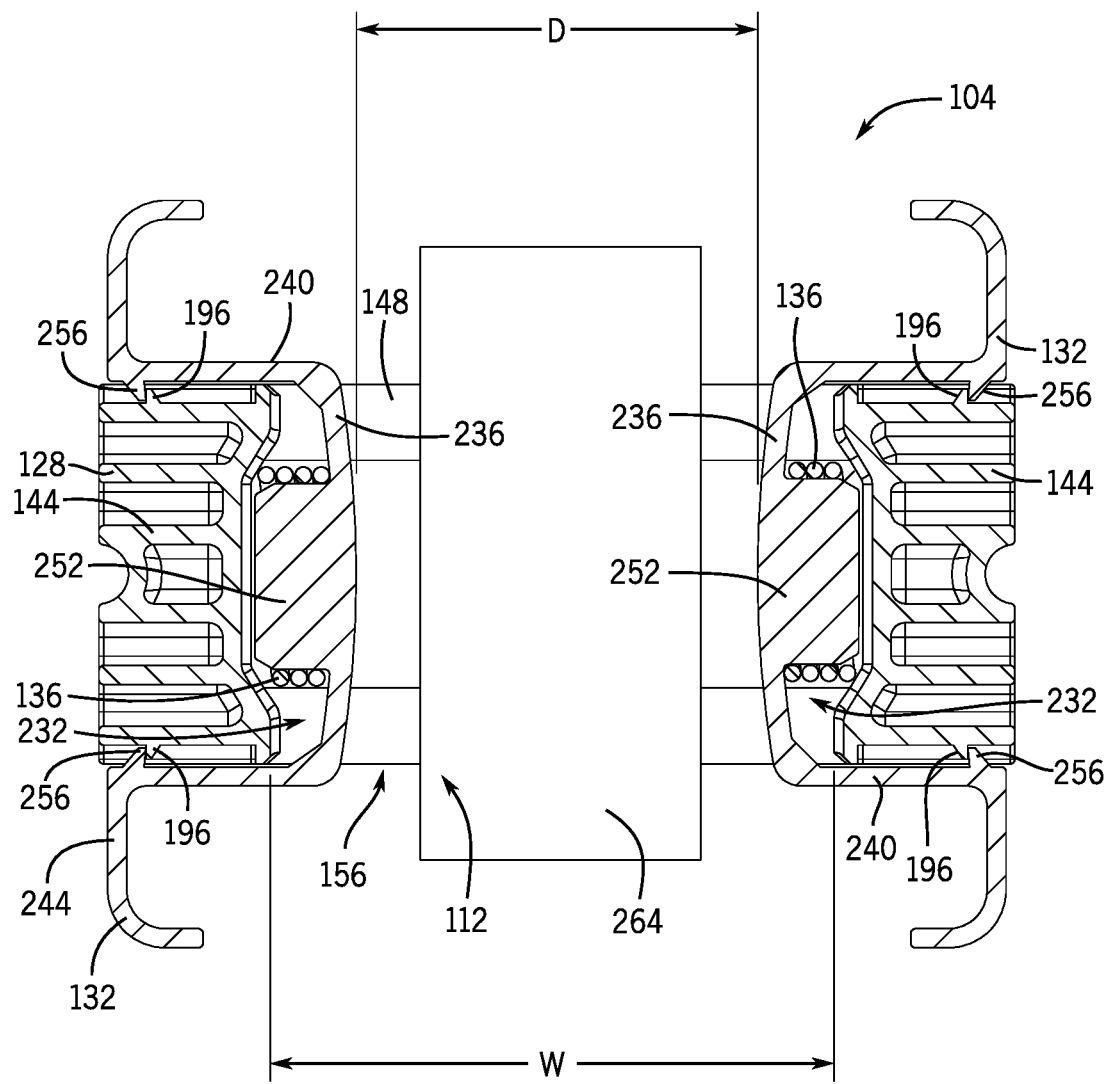
FIG. 11 is a top plan view of the adjustable clip subassembly of FIG. 5 in an open configuration, with a conductor.

FIG. 11 illustrates a partial cross-section of the clip subassembly 104. The clips 132, as shown, are disposed on opposing sides of the receiving space 156 of the housing 128. For example, each of the clips 132 are positioned adjacent to a corresponding one of the lateral walls 144 of the housing 128 so that the receiving region 232 of the clip 132 receives the corresponding lateral wall 144, and the biasing element 136 extends from the clip 132 to the inner surface of the lateral wall 144. Other configurations, however, are possible. For example, a clip subassembly (i.e., similar to clip assembly 104) could include a single clip (i.e., similar to clip 132) that receives one of the lateral walls 144 of the housing 128, while the opposing wall 144 could include a stationary pad (not shown) or other structure different from the clip 132. In such an embodiment, a biasing element (i.e., similar to biasing element 136) could bias the clip towards the pad (or other structure) on the opposing wall 144, so that a conductor could be received between the biased clip and the stationary pad (and the wall 144 generally).

Generally, the subassembly 104 is configured to move between an open configuration and a closed configuration, the open configuration being illustrated in FIG. 11. In the open configuration, the clip 132 is positioned near the corresponding lateral wall 144 so that the biasing element 136, e.g., a spring, is compressed, and the latch projections 256 engage the mating projections 196 defined by the housing 128. The clip 132 can maintain the open configuration because of the engagement between the latch projections 256 and the mating projections 196 (or, in other embodiments, between other sets of latch and mating features, such as other corresponding projections, corresponding projections and recesses, etc.). In the open configuration, the opposing clips 132 are spaced apart to increase an open volume of the receiving passage 112 (i.e., to provide larger clearance between the clips 132 within the receiving passage 112), which can allow insertion of a conductor 264 between the opposing clips 132.

Figure 12:
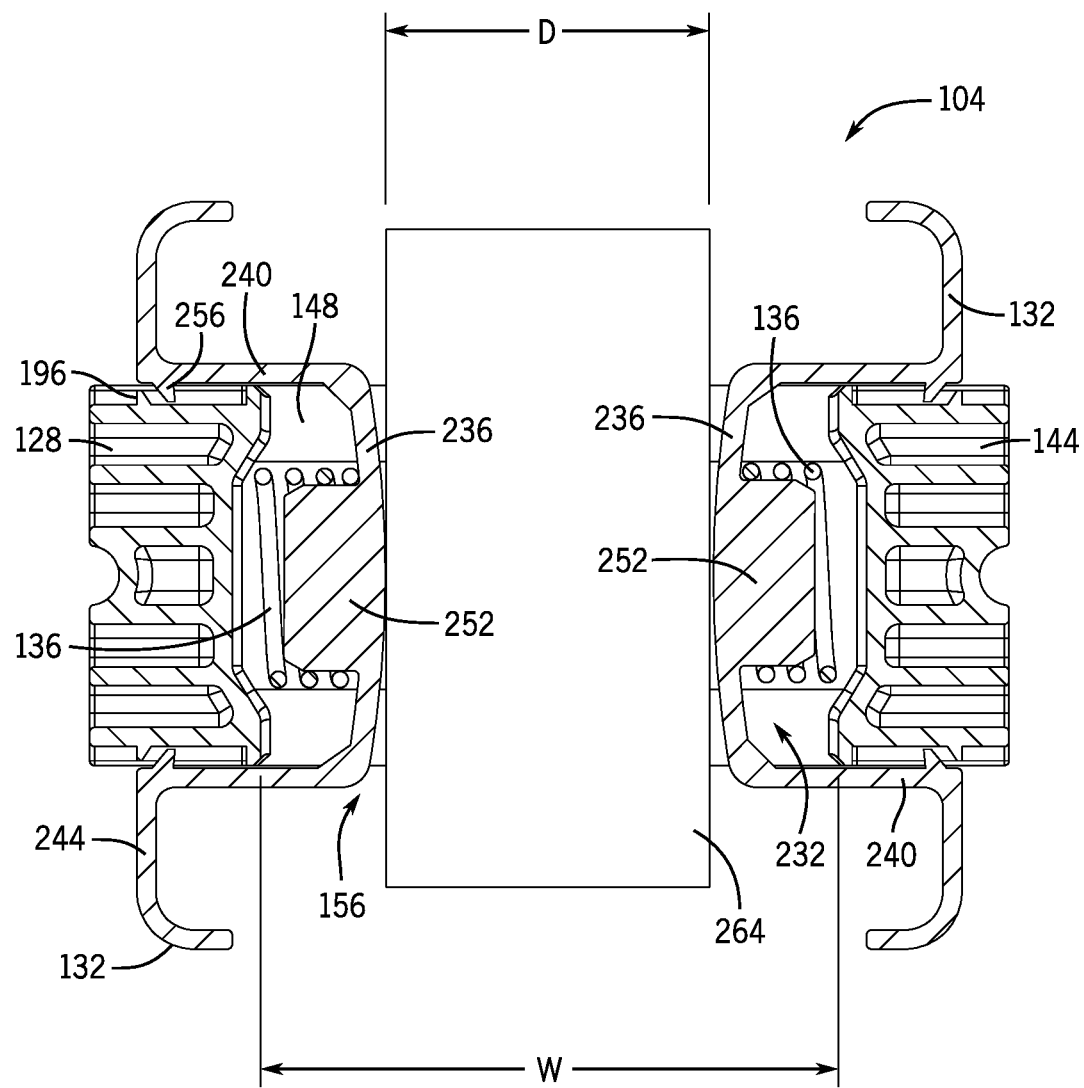
FIG. 12 is a top plan view of the adjustable clip subassembly of FIG. 11 in a closed configuration, with the conductor.

Turning to FIG. 12, in the closed configuration, the latch projections 256 of the clips 132 no longer engage the mating projections 196 of the housing 128. Accordingly, the biasing elements 136 move the clips 132 inwardly, (e.g., into the receiving space 156, toward a center of the receiving space 156, toward each other, or toward the conductor 264) which decreases a clearance distance D between the clips 132, as compared to a larger clearance distance when the clips are in an open configuration (see, e.g., FIG. 11). Further, in the closed configuration, the base walls 236 of the clips 132 may be farther from the housing 128 than in the open configuration. To move the subassembly 104 to the closed configuration, an installer may manually disengage the latch projections 256 of the clips 132, and the biasing elements 136 will subsequently translate the clips 132 a suitable distance.

The engagement tabs 244 of the clips 132 may be useful for the purpose of moving the clips 132 between the open configuration and the closed configuration. For example, the engagement tabs 244 may provide an easily accessible engagement point for an operator, enabling the operator to grip both ends of the clip 132, either to move it to the open configuration, or to disengage the latch projections 256 from the mating projections 196, allowing the biasing element 136 to move the clip into the closed configuration.

Figure 18:
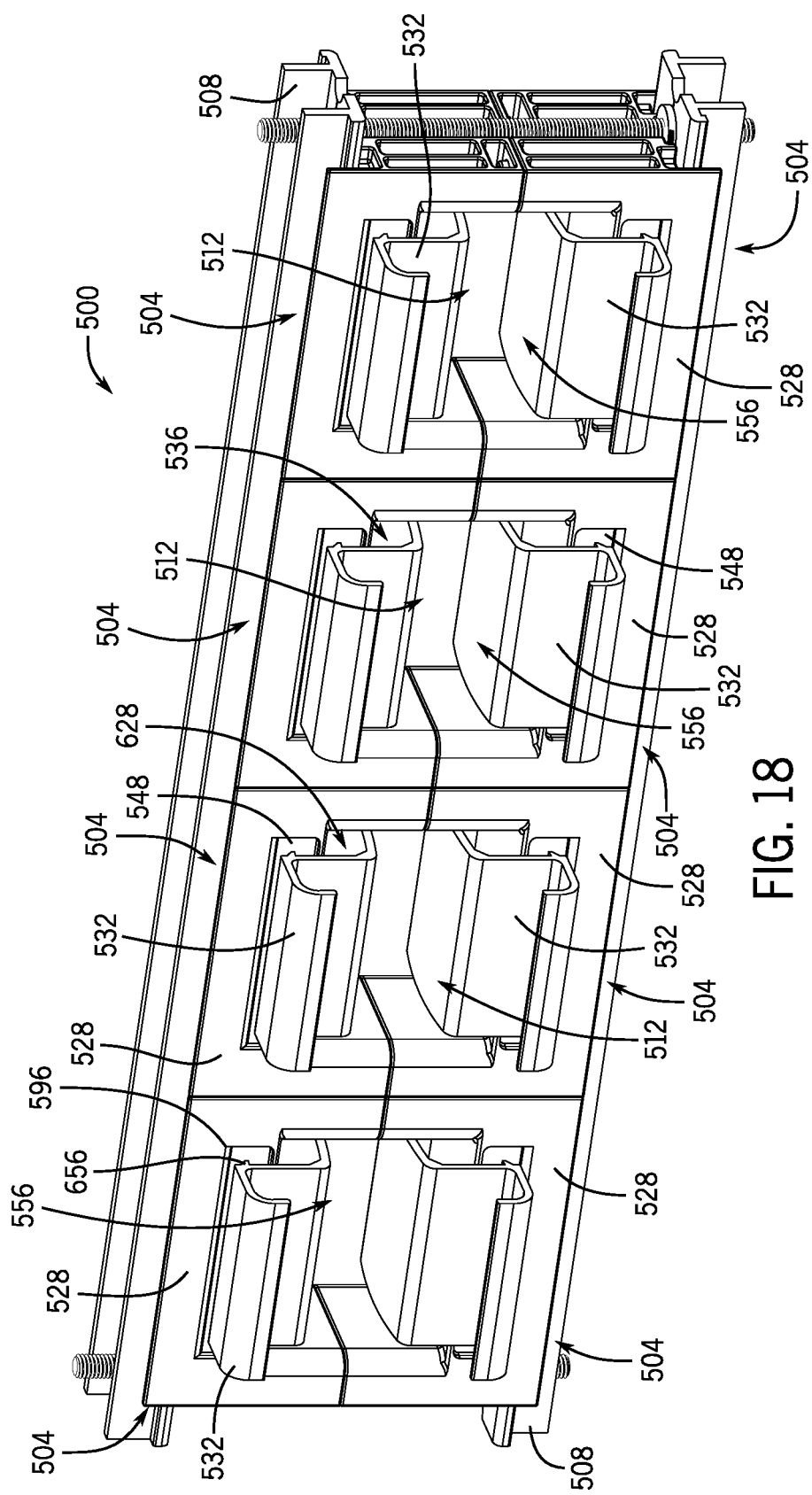
FIG. 18 is an isometric view of a support assembly for supporting conductors according to another embodiment of the invention.
Figure 19:
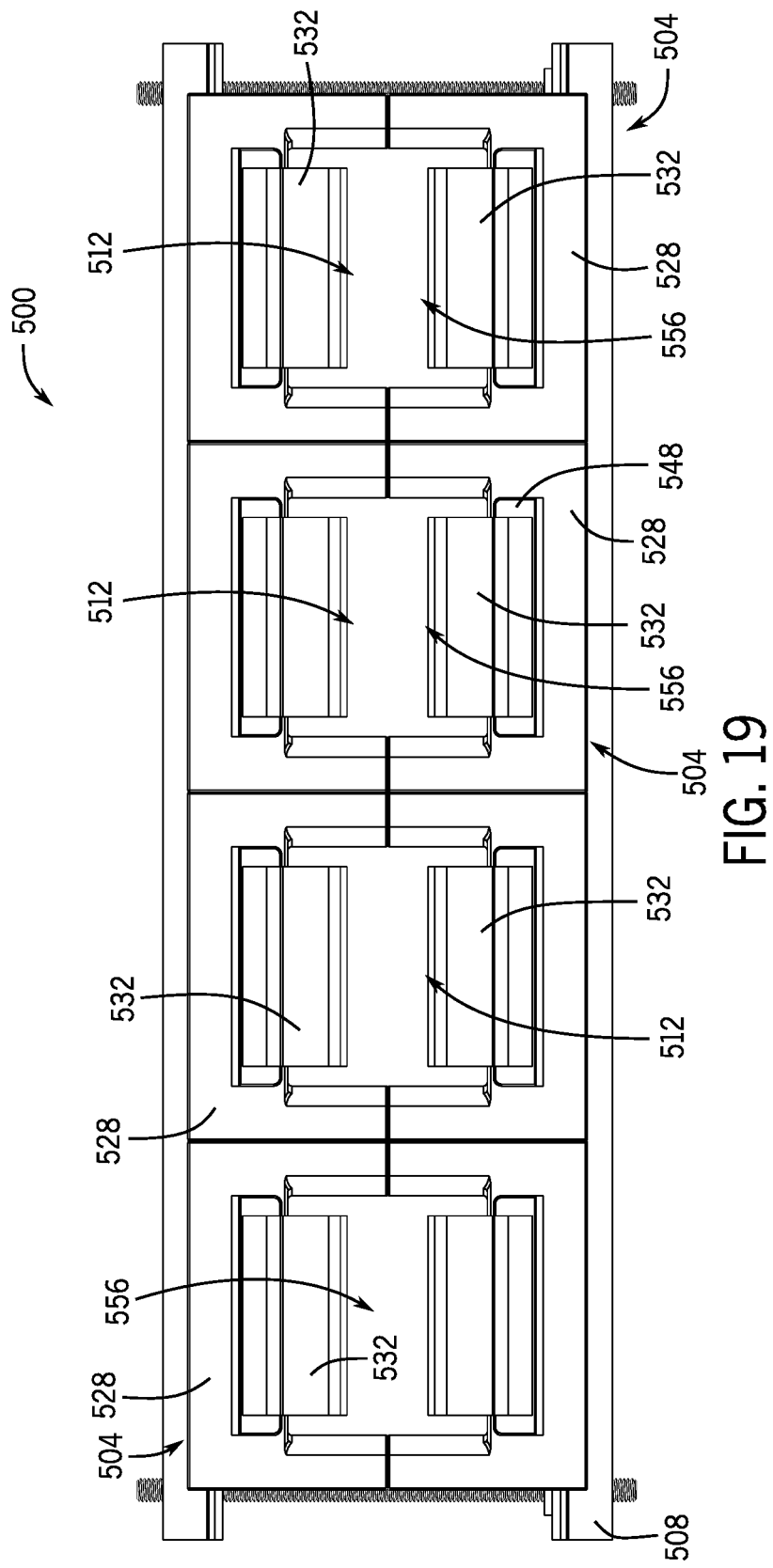
FIG. 19 is a front elevation view of the support assembly of FIG. 18.
Figure 20:
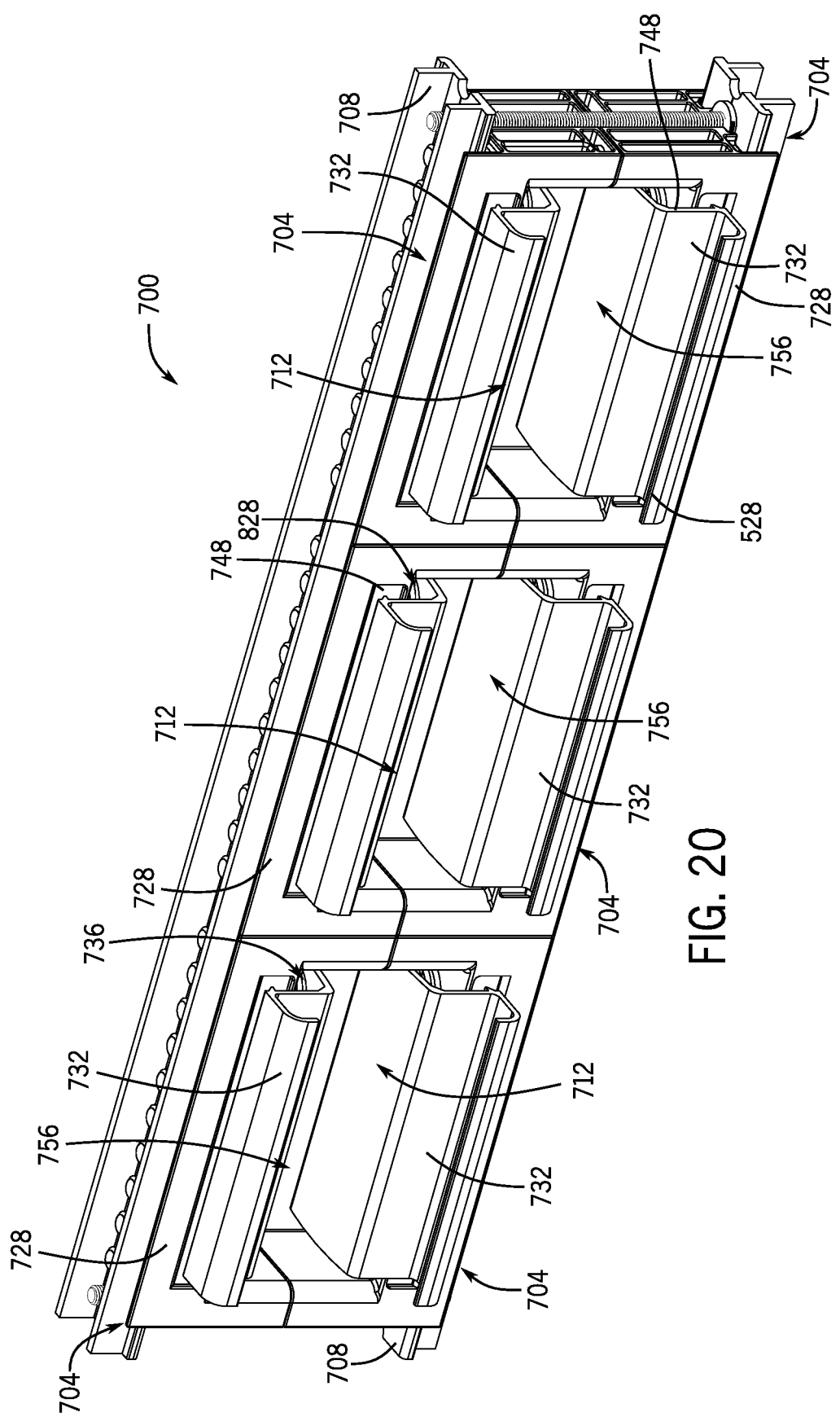
FIG. 20 is an isometric view of a support assembly for supporting conductors according to yet another embodiment of the invention.

In some embodiments, the shape of the biased clip may add stability to a support assembly, and to the conduit secured thereby. For example, as described above, the clip 132 may be U-shaped, with a receiving region 232 defined by a base wall 236 and two opposing sidewalls 240. As illustrated, for example, in FIGS. 11 and 12, when the clip 132 is installed onto a housing 128, a lateral wall 144 can be at least partially received into the receiving region 232 of the clip 132. When so installed, the sidewalls 140 of a given clip 132 are respectively positioned on either of two opposing sides of one of the lateral walls 144. The engagement of the sidewalls 140 and the corresponding lateral walls 144 constrains movement of the clip in a direction that is parallel to an insertion direction of the conductor 264, preventing translation of the clips 132 in that direction. The sidewalls 140 can maintain engagement with the lateral walls 144 when the clip is in the open configuration (e.g., as shown in FIG. 11) and when the clip 132 is in the closed configuration (e.g., as shown in FIG. 12), providing stability in either case. Thus configured, for example, the clip 132 operates as a plunger that can generally be displaced a variable distance in a single direction (i.e., into a receiving space 156) to secure a conductor (e.g., the conductor 264 shown in FIG. 12). Other embodiments are possible, including embodiments in which the base of a housing is received into a receiving region of a clip (e.g., as shown in FIGS. 18-20).

In some installation, when a conductor is disposed in the receiving space 156 (e.g., the conductor 264), the clips 132 may translate (or be otherwise displaced) until they abut the conductor 264, regardless of the size of the conductor (within a particular range of sizes). Therefore, conductors of varying widths may be secured within the receiving space 156 without modification or replacement of the various parts of the subassembly 104. In some embodiments, the subassembly can accommodate conductors having widths between 40% and 90% of the total width W of the receiving space, between 60% and 90% of the width W, between 50% and 95% of the width W, or between 30% and 85% of the with W. As previously discussed, the clip 132 can operate as a plunger, as can ensure that the clips 132 may generally only be displaced along a single direction from the closed configuration, (i.e., in-line with the direction in which the clip is biased). Thus, even movement of a conductor along an insertion direction (e.g., perpendicular to the direction in which the clips 132 are biased into the receiving space 156) will not necessarily produce a corresponding displacement of the clip 132 in the same direction.

Figure 13:
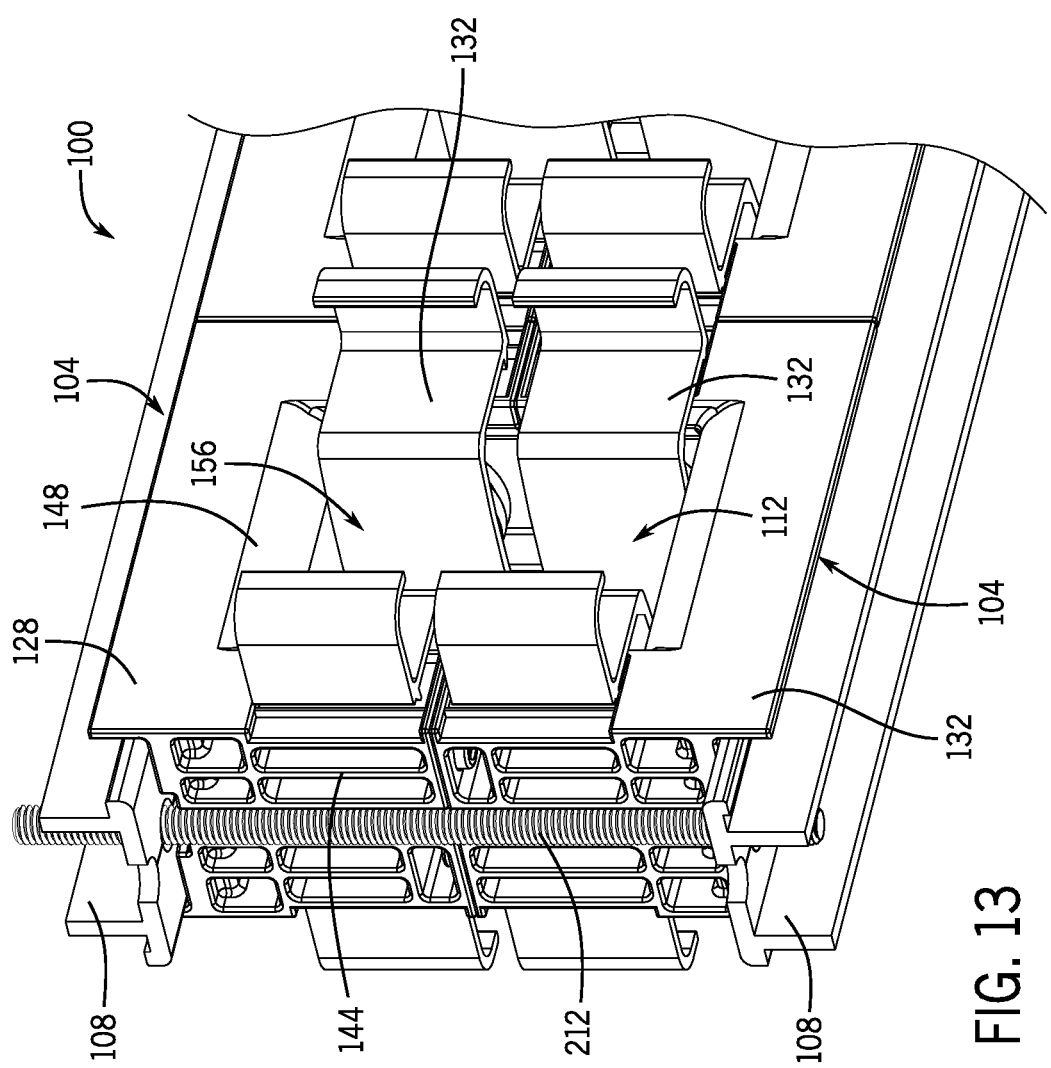
FIG. 13 is a partial isometric view of the support assembly of FIG. 3.

Referring to FIG. 13, subassemblies according to embodiments of the invention may be preassembled in some cases. For example, in some installations, subassemblies may be assembled and then collectively placed in the open configuration. Further, an installer may couple two preassembled subassemblies before securing it to one or more mounting struts. An installer may secure an appropriate number of subassemblies to one or more mounting struts to accommodate any number of conductors. Because the subassemblies may be preassembled in the open configuration, when an installer installs a support assembly and routes conductors through the support structure, a volume of the receiving space is already increased (relative to the closed configuration), and a distance between clips may correspondingly already be substantially maximized, so the installer simply needs to insert a conductor and disengage the clips, which may expedite the installation process of a system.

Figure 14:
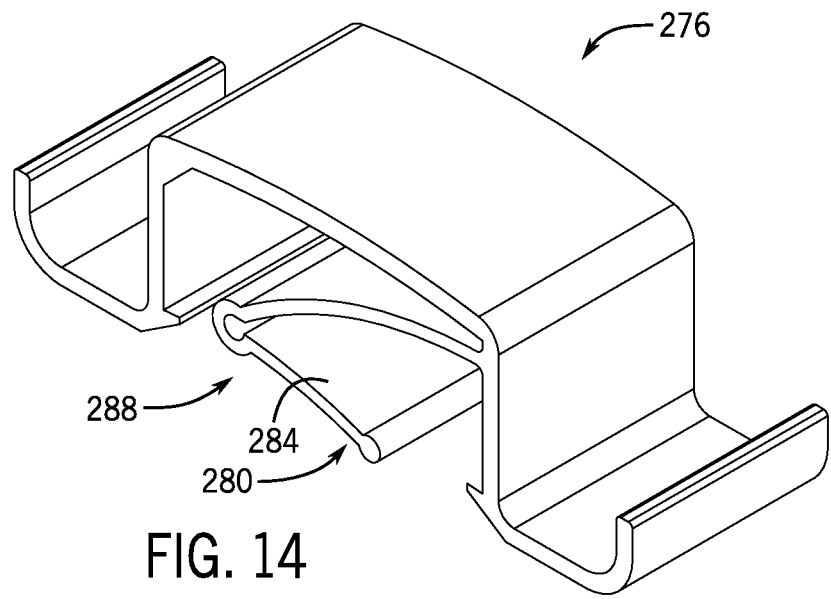
FIG. 14 is an isometric view of a clip for use in an adjustable clip subassembly according to another embodiment of the invention.
Figure 15:
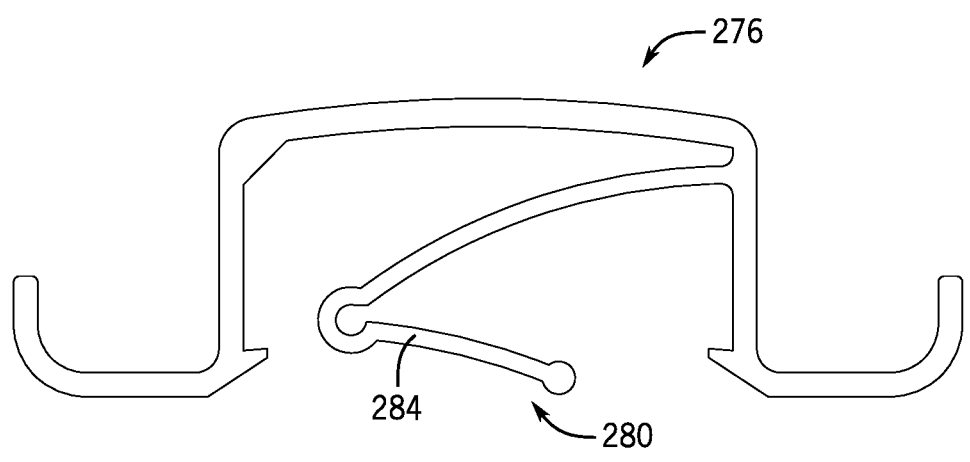
FIG. 15 is a front elevation view of the clip of FIG. 14.

While the support assembly 100 illustrated in FIGS. 3-13 shows the biasing element 136 as being a helical spring, other configurations are possible. For example, FIGS. 14 and 15 illustrate another example embodiment of a biased clip 276 for use in support assemblies according to embodiments of the present invention. The clip 276 may be similar in design and functionality to the clip 132 shown in FIGS. 9 and 10, and may correspondingly function similarly and be configured for use with similar subassemblies. However, the clip 276 may differ in some aspects, including as described herein or as apparent from the figures. For example, instead of a helical spring, the clip 276 can include a biasing element 280 that is an integral, flexible spring arm 284. In some cases, accordingly, the clip 276 may be formed from an extruded, longer component that is then cut to a customizable length. In further alternative embodiments, the biasing element may comprise any other mechanism suitable for biasing a clip relative to a housing, including, for example, leaf springs, wave springs, volute springs, cantilever springs, etc.

Figure 16A:
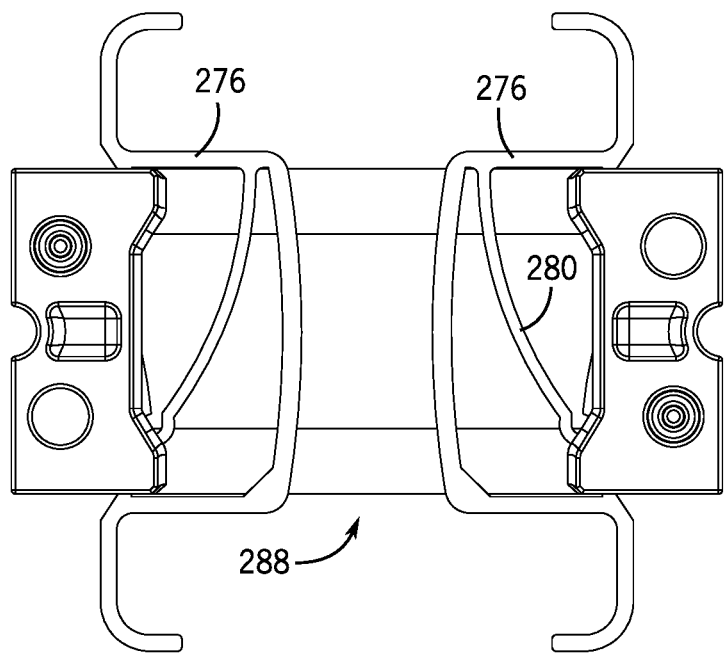
FIG. 16A is a top plan view of the clip of FIG. 14 installed in an adjustable clip subassembly in a closed configuration.
Figure 16B:
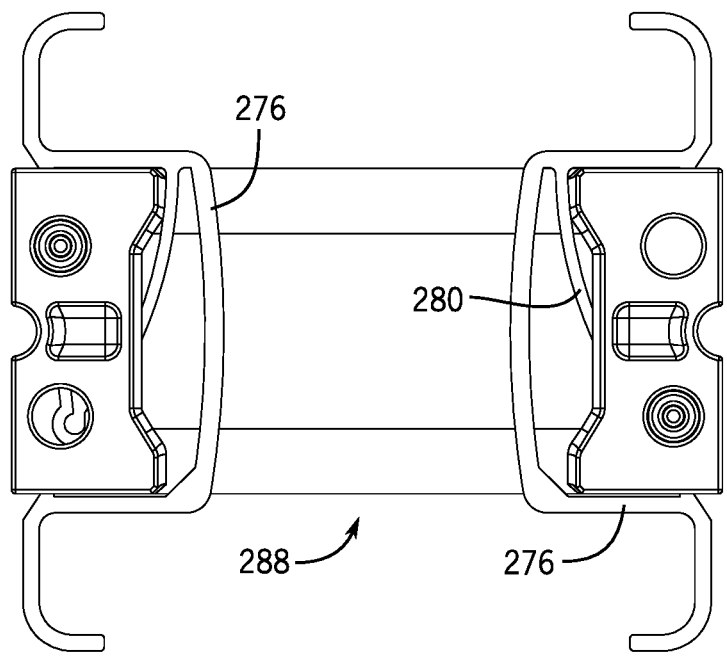
FIG. 16B is a top plan view of the clip and the adjustable clip subassembly of FIG. 16A in an open configuration.

FIGS. 16A and 16B illustrate the clip 276 in a closed configuration and an open configuration, respectively, as part of a subassembly similar to the subassembly 104. Like the biasing element 136 of FIGS. 11 and 12, the biasing element 280 is configured to laterally translate the clip 276 within a receiving space 288 from the open configuration (as shown in FIG. 16B) toward the closed configuration (as shown in FIG. 16A). In this regard, although translation may provide for relatively uniform and reliable engagement of a conductor, some embodiments can be configured to instead (or additionally) rotate between open and closed configurations.

Other configurations of biasing elements may be used in alternative embodiments. For example, a conical, flexible tube may be used with a clip to automatically engage a conductor upon insertion of the conductor. More specifically, in an open configuration, the clip may maintain an angled orientation relative to a housing. During insertion, the conductor may engage the clip, and the conical, flexible tube may cause the clip to pivot and engage the conductor, thereby self-securing the conductor. Some embodiments of the present inventions may incorporate additional or alternative elements for securing a conductor. For example, instead of a biased clip, a wedge may be used to engage and secure a conductor. The wedge may be similarly arranged within a receiving space of a housing so that it wedges between the conductor and the housing. A plurality of biased wedges may engage a single conductor on opposing sides. In some installations, the wedges may be manually moved to engage the conductor. In some installations, the wedges may be biased, e.g., by a spring, to engage the conductor.

Figure 17:
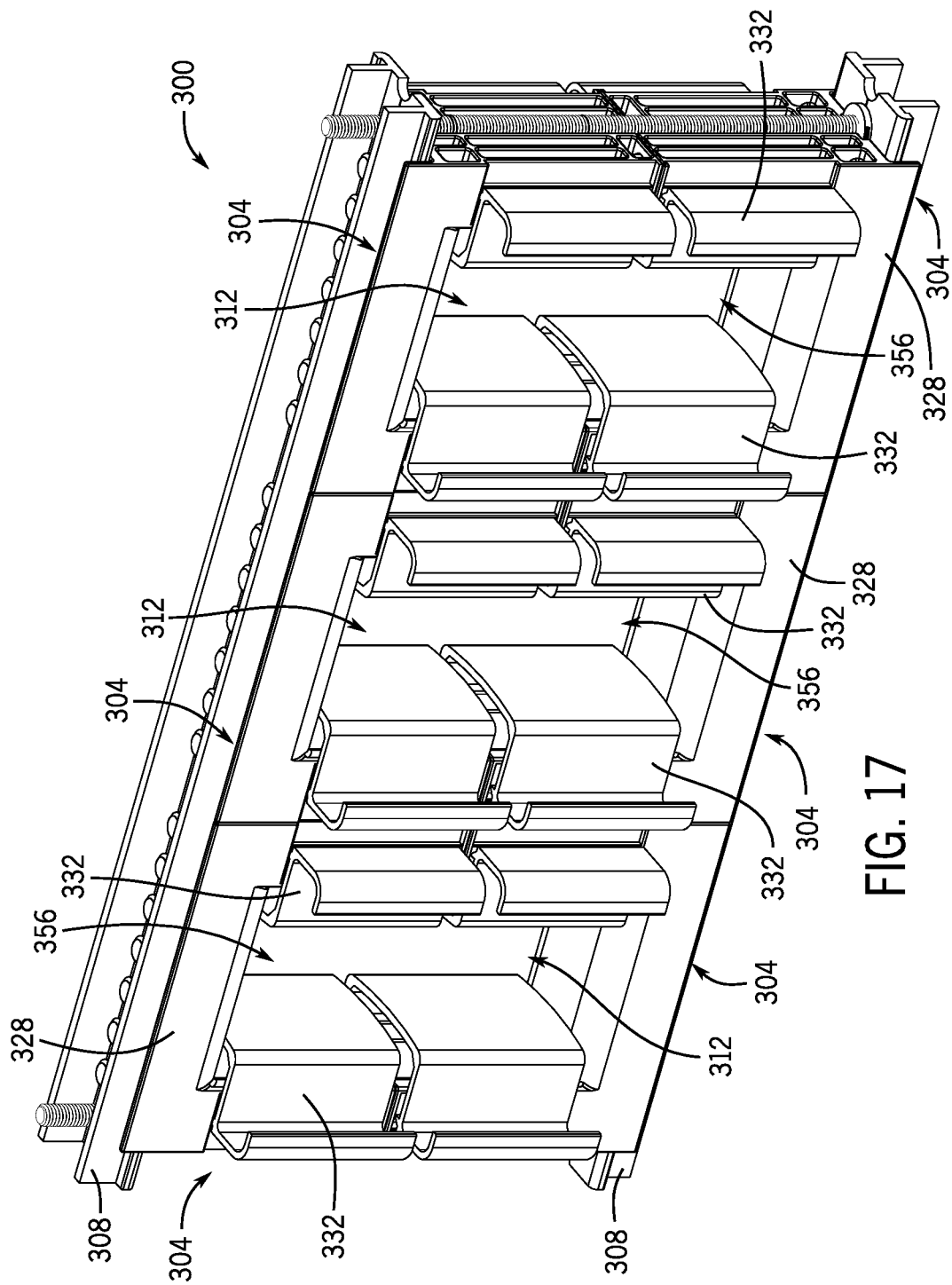
FIG. 17 is an isometric view of a support assembly for supporting conductors according to an embodiment of the invention.

FIG. 17 illustrates another embodiment of a support assembly 300 according to the present invention. The support assembly 300 may be similar in design and functionality to the support assembly 100 of FIGS. 3-13, with similar elements identified using like reference numerals. However, the support assembly 300 may differ in some aspects, including as described herein or as apparent from the figures. For example, like the support assembly 100, the support assembly 300 includes a plurality of adjustable clip subassemblies 304 arranged along mounting struts 308. However, the support assembly 300 in the illustrated embodiment is dimensioned to accommodate larger (e.g., wider) conductors than the support assembly 100. Support structures according to other embodiments, however, may be dimensioned differently than the embodiments illustrated herein. For example, components for adjustable clip subassemblies may be dimensioned to increase or decrease a receiving space to accommodate particular conductors.

FIGS. 18 and 19 illustrate another example of a support assembly 500 according to an embodiment of the present invention. The support assembly 500 may be similar in design and functionality to the support structures 100, 300 discussed above, with similar elements identified using like reference numerals. However, the support assembly 500 may differ in some aspects, including as described herein or as apparent from the figures. For example, like the support assembly 100 of FIGS. 3-13, the support assembly 500 includes a plurality of adjustable clip subassemblies arranged along mounting struts 508 and including a housing 528. However, unlike the adjustable clip subassemblies 104, the adjustable clip subassemblies 504 include a biased clip 532 that is arranged along a base 548 of the housing 528. Therefore, rather than engaging an inner surface of lateral walls of the housing, the biased clip 532 and its biasing element 536 engage the base 548 of the housing 528.

Other than the relative direction of movement of the clips 532, the support assembly 500 in the illustrated embodiment operates similarly to the support assembly 100, such that discussion of similar clip features and functionality above generally also applies to the clips 532. For example, each of the spring-actuated clips 532 includes a latch projection 656 that is configured to mate with a mating projection 596 on the housing 528 for maintaining an open configuration of the clip subassembly 504. Likewise, manual disengagement of the latch projections 656 and the mating projections 596 enables the clip 532 to be actuated toward the closed configuration to abut a conductor. Similarly to the support assembly 100, the spring actuated clips 532 operate as plungers, configured to displace along a single direction (e.g., as shown, parallel to the direction in which the clip 532 is biased relative to the housing 528). Due to the positioning of the clips 532 along the bases 548 of their respective housings 528, when assembled, the support assembly 500 may be configured to receive and retain conductors in a horizontal orientation. In some embodiments, it may be useful to route a plurality of conductors in a horizontal orientation. In some embodiments, it may be useful to route a mixture of horizontally-oriented conductors and vertically-oriented conductors. In such an arrangement, components from both the support assembly 500 and the support assembly 100 of FIG. 3 may be useful.

Similar to the support structures 100, 300, components of the illustrated support assembly 500 may be dimensioned differently than illustrated in FIGS. 18 and 19. For example, FIG. 20 illustrates another embodiment of a support assembly 700 according to the present invention. The support assembly 700 may be similar in design and functionality to the support structures 100, 300, 500, with similar elements identified using like reference numerals. However, the support assembly 700 may differ in some aspects, as described herein or as apparent from the figures. For example, like the support assembly 500 of FIGS. 18 and 19, the support assembly 700 includes a plurality of adjustable clip subassemblies 704 arranged along mounting struts 708. Each of the adjustable clip subassemblies 704 includes a housing 728 and a biased clip 732 disposed on a base 748 of the housing 728, to partly define corresponding receiving spaces 756. However, the support assembly 700 in the illustrated embodiment is configured to accommodate larger (e.g., wider) conductors than the support assembly 500 of FIG. 18.

In some embodiments, it may be useful to accommodate conductors of varying sizes and orientations. Therefore, it may be useful to use a combination of the embodiments discussed herein. For example, a combination of adjustable clip subassemblies, e.g., of any number of the adjustable clip subassembly 104 of FIG. 3, the adjustable clip subassembly 304 of FIG. 17, the adjustable clip subassembly 504 of FIG. 18, or the adjustable clip subassembly 704 of FIG. 20, in various combinations, may be incorporated into a single support assembly. It should be understood that any combination of the embodiments discussed herein are possible.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

Thus, embodiments of the present invention may provide a modular and adjustable support assembly that may enhance installation adaptability and capability. For example, some embodiments can be readily (e.g., manually) disposed in different configurations to, respectively, allow a conductor to be easily inserted during installation, and firmly, but flexibly, retain the conductor in place thereafter. Further, some embodiments can be readily adapted to a variety of different sizes, shapes, and installed orientations of conductors, including relative to arrays of multiple conductors of the same or different sizes.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A support assembly, for supporting one or more conductors, the support assembly comprising:
    a first clip subassembly including:
        a first housing with a first lateral wall and a second lateral wall extending from opposing sides of a base to define a first receiving space between the first and second lateral walls for one or more conductors;
        a first clip and a second clip, each of the first and second clips including sidewalls extending from a base wall, and the first and second clips being disposed so that the first lateral wall of the first housing is received between the sidewalls of the first clip and the second lateral wall of the first housing is received between the sidewalls of the second clip;
        a first biasing element disposed between the first clip and the first lateral wall to bias the first clip toward the second clip; and
        a second biasing element disposed between the second clip and the second lateral wall to bias the second clip toward the first clip;

the first and second clips being movable relative to the first and second lateral walls to selectively place the first clip subassembly in:
- an open configuration, in which the first and second clips provide a first clearance within the first receiving space for insertion of the conductor; and
- a closed configuration, in which the first and second clips are laterally displaced toward each other, relative to the open configuration, to provide a second clearance within the first receiving space to retain the conductor, the second clearance being smaller than the first clearance; and
- the first and second clips are lockable relative to the first housing to secure the first clip assembly in the open configuration.

2. The support assembly of claim 1, wherein each of the first and second clips further includes a latch projection and the first housing includes mating projections, each of the latch projections being configured to engage a corresponding at least one of the mating projections to secure the first or second clip, respectively, in the open configuration.

3. The support assembly of claim 2, wherein each of the first and second clips includes engagement tabs that extend from the sidewalls away from the first housing, the engagement tabs being configured to be manually engaged to disengage the latch projections from the mating projections.

4. The support assembly of claim 1, wherein the first and second biasing elements are helical springs.

5. The support assembly of claim 1, wherein the first and second biasing elements are integrally formed spring arms.

6. The support assembly of claim 1, wherein each of the first and second clips includes a receiving region defined by the base wall and the sidewalls of the respective clip, the receiving regions oriented to be on an opposite side of the corresponding first or second clip from a conductor secured between the first and second clips; and
- wherein a first end of each of the biasing elements is seated on the corresponding first or second clip within the receiving region; and
- a second end of each of the biasing element is seated on a corresponding one of the first and second lateral walls of the housing.

7. The support assembly of claim 1, further comprising:
a second clip subassembly including:
- a second housing with a second base and lateral walls that define a second receiving space; and
- clips that are movable within the second receiving space between an open configuration and a closed configuration and are biased relative to the second housing toward the closed configuration;
the first clip subassembly and the second clip subassembly being secured adjacent to each other, with distal ends of the first and second lateral walls of the first housing secured to distal ends of the lateral walls of the second housing so that the first receiving space is continuous with the second receiving space to collectively receive one or more conductors.

8. The support assembly of claim 7, further comprising:
a first mounting strut and a second mounting strut, each of the first and second mounting struts being configured to engage a respective one of the first clip subassembly and the second clip subassembly, to adjacently secure the first and second clip subassemblies;
wherein each of the first and second housings further defines a mounting channel that includes a plurality of mounting protuberances; and
wherein each of the mounting struts includes a plurality of mounting openings, the mounting openings being sized to receive the mounting protuberances to secure the corresponding housing to the mounting strut.

9. An adjustable clip assembly, for use in a support assembly for supporting conductors, the adjustable clip assembly comprising:
- a housing with opposing lateral walls extending from a base portion to define a receiving space;
- a clip; and
- a biasing element disposed between the clip and the housing to bias the clip into the receiving space,
- wherein the adjustable clip assembly is configured to move between an open configuration and a closed configuration, the clip being locked to the housing to compress the biasing element between the clip and the housing in the open configuration, and the clip being displaced into the receiving space by the biasing element in the closed configuration, relative to the open configuration, to engage and retain the conductor.

10. The adjustable clip assembly of claim 9, wherein the clip further includes opposing sidewalls that extend from a base wall to define a receiving region between the sidewalls, the clip being disposed so that the receiving region receives a portion of the housing.

11. The adjustable clip assembly of claim 10, wherein the receiving region receives a portion of one of the lateral walls of the housing.

12. The adjustable clip assembly of claim 10, wherein the receiving region receives a portion of the base portion of the housing.

13. The adjustable clip assembly of claim 12, wherein the biasing element is seated on the clip within the receiving region and the receiving space.

14. The adjustable clip assembly of claim 10, wherein an inner surface of at least one of the opposing sidewalls defines a latch feature configured to engage a corresponding mating feature defined by the housing to maintain the adjustable clip assembly in the open configuration.

15. The adjustable clip assembly of claim 14, wherein the clip includes engagement tabs that extend from the opposing sidewalls away from the housing, the engagement tabs being configured to be manually engaged to disengage the latch feature from the corresponding mating feature.

16. The adjustable clip assembly of claim 10, wherein a first of the opposing sidewalls is disposed on a first lateral side of the housing, and a second of the opposing sidewalls is disposed on a second lateral side of the housing to constrain movement of the clip relative to the housing in a direction perpendicular to the displacement of the clip into the receiving space.

17. A support assembly for supporting conductors, the support assembly comprising:
a first clip subassembly and a second clip subassembly, each of the first clip subassembly and the second clip subassembly including:
- a housing with opposing lateral walls extending from a base portion to define a receiving space;
- a clip that includes opposing sidewalls extending from a base wall, the clip being movably secured to the housing with the housing received between the opposing sidewalls; and
- a biasing element disposed between the base wall of the clip and the housing to bias the clip away from the housing,
wherein each of the subassemblies are configured to move between an open configuration and a closed configuration and to engage the housing to be locked in the open configuration, the base wall of the clip being positioned farther from the housing in the closed configuration than in the open configuration.

18. The support assembly of claim 17, wherein distal ends of the opposing lateral walls of each of the housings define an open end of the corresponding receiving space; and wherein the first clip subassembly and the second clip subassembly are configured to be removably coupled together at the distal ends of the opposing lateral walls so that the receiving spaces are continuous with each other.

19. The support assembly of claim 18, wherein each of the housings defines a mounting channel along an underside of the base portion, with a plurality of mounting protuberances extending from the underside of the base portion into the mounting channel; and wherein each of the plurality of mounting protuberances is sized to be received into a corresponding opening of a plurality of mounting openings of a corresponding first or second mounting strut to secure the housings to the first and second mounting struts.

20. The support assembly of claim 19, wherein a partly cylindrical channel extends, respectively along a laterally external side of each of the lateral walls of each of the housings, from the base portion to the distal end of the corresponding lateral wall; and wherein the partly cylindrical channel along a first of the opposing sidewalls of the housing of the first clip subassembly is aligned with the partly cylindrical channel along a first of the opposing sidewalls of the second clip subassembly to receive a first fastener to secure the first and second clip assemblies to the first and second mounting struts; and wherein the partly cylindrical channel along a second of the opposing sidewalls of the housing of the first clip subassembly is aligned with the partly cylindrical channel along a second of the opposing sidewalls of the second clip subassembly to receive a second fastener to secure the first and second clip assemblies to the first and second mounting struts.

* * * * *